(12) United States Patent
Takagi et al.

(10) Patent No.: US 8,780,528 B2
(45) Date of Patent: Jul. 15, 2014

(54) ELECTROLYTE AND ELECTRIC DOUBLE-LAYER CAPACITOR USING SAME

(75) Inventors: Seiji Takagi, Osaka (JP); Hideki Shimamoto, Kyoto (JP); Hiroyuki Maeshima, Hyogo (JP); Nao Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/119,432

(22) PCT Filed: Jun. 25, 2012

(86) PCT No.: PCT/JP2012/004084
§ 371 (c)(1),
(2), (4) Date: Nov. 21, 2013

(87) PCT Pub. No.: WO2013/001776
PCT Pub. Date: Jan. 3, 2013

(65) Prior Publication Data
US 2014/0085774 A1 Mar. 27, 2014

(30) Foreign Application Priority Data
Jun. 27, 2011 (JP) .................................. 2011-141355

(51) Int. Cl.
*H01G 9/00* (2006.01)
(52) U.S. Cl.
USPC ........... 361/502; 361/503; 361/504; 361/512; 361/525; 361/528
(58) Field of Classification Search
USPC ......... 361/502, 503–504, 509–512, 516–519, 361/523–525, 528–530
See application file for complete search history.

(56) References Cited

U.S. PATENT DOCUMENTS

| 6,307,735 | B1 * | 10/2001 | Saito et al. ................ 361/517 |
| 6,382,600 | B1 * | 5/2002 | Mahr ........................ 261/78.2 |
| 6,765,785 | B2 * | 7/2004 | Honda et al. .............. 361/525 |
| 6,839,222 | B2 * | 1/2005 | Takaoka et al. ........... 361/512 |
| 6,888,717 | B2 * | 5/2005 | Kinard et al. ............. 361/504 |
| 6,970,343 | B2 * | 11/2005 | Hayashi et al. ........... 361/504 |
| 7,268,995 | B2 * | 9/2007 | Yoshida et al. ........... 361/502 |
| 7,564,676 | B2 * | 7/2009 | Kitajima et al. .......... 361/502 |
| 2012/0129035 | A1 | 5/2012 | Takahata et al. |

FOREIGN PATENT DOCUMENTS

| JP | 07-122467 A | 5/1995 |
| JP | 2006-024412 A | 1/2006 |
| JP | 2006-216564 A | 8/2006 |
| JP | 2006-228601 A | 8/2006 |
| JP | 2008-293813 A | 12/2008 |
| WO | 2011/016113 A1 | 2/2011 |

OTHER PUBLICATIONS

International Search Report issued in International Application No. PCT/JP2012/004084 with Date of mailing Sep. 25, 2012.

\* cited by examiner

*Primary Examiner* — Nguyen T Ha
(74) *Attorney, Agent, or Firm* — McDermott Will & Emery LLP (57) ABSTRACT

An electrolyte includes an organic solvent, a solute and a compound represented by chemical formula [1], both contained in the organic solvent. $R^1$ and $R^2$ represent a methyl group or an ethyl group; $R^3$ represents a functional group having a straight chain including three or more carbon atoms and a hydroxyl group bonded to a terminal carbon; C represents a carbon atom; H represents a hydrogen atom; O represents an oxygen atom; and N represents a nitrogen atom.

$$\underset{R^2}{\overset{R^1}{N}}-CH_2-CO-R^3 \quad [1]$$

8 Claims, 3 Drawing Sheets

ELECTROLYTE AND ELECTRIC DOUBLE-LAYER CAPACITOR USING SAME

RELATED APPLICATIONS

This application is the U.S. National Phase under 35 U.S.C. §371 of International Application No. PCT/JP2012/004084, filed on Jun. 25, 2012, which in turn claims the benefit of Japanese Application No. 2011-141355, filed on Jun. 27, 2011, the disclosures of which Applications are incorporated by reference herein.

TECHNICAL FIELD

The present invention relates to an electrolyte and an electric double-layer capacitor using the electrolyte used for various electronic apparatuses, vehicle-mounted storage units, or the like.

BACKGROUND ART

An electric double-layer capacitor includes a capacitor element, a metal case, and a rubber sealing member. The capacitor element includes a positive electrode provided with an electrode layer including activated carbon on a metal foil, a negative electrode having the same configuration as that of the positive electrode, and a separator interposed between the positive electrode and the negative electrode. The capacitor element is accommodated in the metal case together with an electrolyte, and an opening of the metal case is sealed with the rubber sealing member. Then, in order to lead out electrodes from the capacitor element, a connecting member such as a lead wire is joined to each of the positive electrode and the negative electrode, and the electrodes are led out through the above-mentioned rubber sealing member.

An electrolyte of a conventional electric double-layer capacitor employs quaternary ammonium salt or quaternary phosphonium salt as a solute. These solutes are chemically active characteristics. Therefore, when an electric double-layer capacitor using these solutes is charged and discharged repeatedly in severe conditions such as, particularly, high temperatures, pH of the electrolyte in a vicinity of the negative electrode is biased to an alkaline side, the electrolyte may creep on the surface of the negative electrode and may leak out from the rubber sealing member to the outside. Furthermore, the rubber sealing member and the lead wire for extracting the negative electrode may corrode, because they are brought into contact with the electrolyte creepage.

Figure 3:
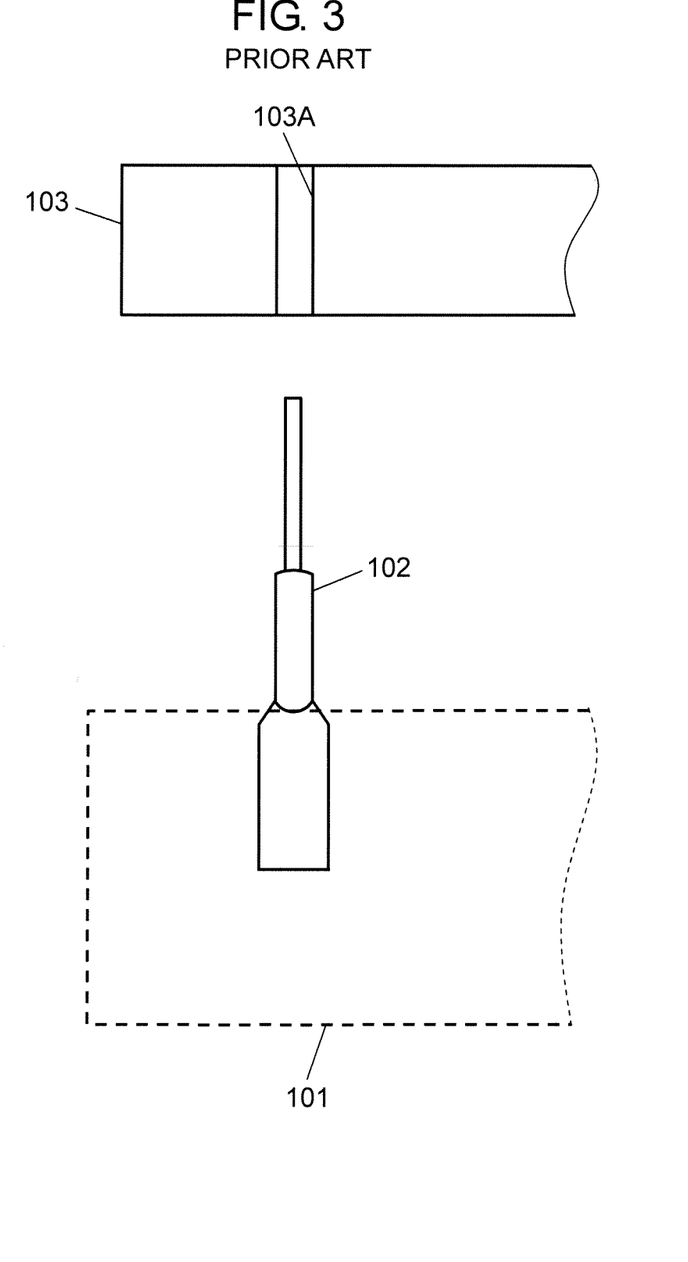
FIG. 3 is a schematic view showing a rubber sealing member and a negative electrode to which a tab terminal is connected, which are used in a conventional electric double-layer capacitor.

A proposal for coping with such problems is described with reference to FIG. 3. FIG. 3 is a schematic view showing a current collector and a rubber sealing member used in a conventional electric double-layer capacitor. Tab terminal 102 as a lead wire is connected to current collector 101 constituting a negative electrode, and tab terminal 102 is inserted into through-hole 103A provided in rubber sealing member 103.

In such a configuration, in order to enhance resistance to corrosiveness due to liquid leakage, chemical conversion coating is formed on surfaces of current collector 101 and tab terminal 102 using oxidizing chemicals. Then, rubber sealing member 103 having through-hole 103A is subjected to resin vulcanization or peroxide vulcanization with butyl rubber, so that hardness of rubber sealing member 103 is made to be a range from 60 to 90 (according to Wallace hardness meter). Such a method has been proposed.

Thus, even if quaternary ammonium salt or quaternary phosphonium salt is used as a solute, leakage of the electrolyte from rubber sealing member 103 to the outside can be suppressed (see, for example, Patent Literature 1).

CITATION LIST

Patent Literature

PTL 1: Japanese Patent Unexamined Publication No. H7-122467

SUMMARY OF THE INVENTION

The present invention relates to an electrolyte and an electric double-layer capacitor using the electrolyte in which a change of pH and the electrolyte creepage are suppressed and reliability is enhanced even if charge and discharge are carried out in severe conditions such as high temperatures,. The electrolyte of the present invention includes an organic solvent, a solute contained in the organic solvent, and a tertiary amine compound represented by chemical formula [1].

[1]

$R^1$ and $R^2$ represent a methyl group or an ethyl group; $R^3$ represents a functional group having a straight chain including three or more carbon atoms and a hydroxyl group bonded to a terminal carbon; C represents a carbon atom; H represents a hydrogen atom; O represents an oxygen atom; and N represents a nitrogen atom.

With this configuration, it is possible to suppress hydrolysis of a solvent, which is caused by a slight amount of moisture contained in the electrolyte. Thus, the change of pH of the electrolyte is suppressed, and the electrolyte creepage in a vicinity of the negative electrode can be suppressed. As a result, in the electric double-layer capacitor using such an electrolyte, liquid leakage can be suppressed.

DESCRIPTION OF EMBODIMENTS

Hereinafter, as measures for suppressing a change of pH and the electrolyte creepage and for improving reliability of an electric double-layer capacitor, an exemplary embodiment of the present invention is described with reference to drawings. The configuration of the present invention is not limited to the following.

Figure 1:
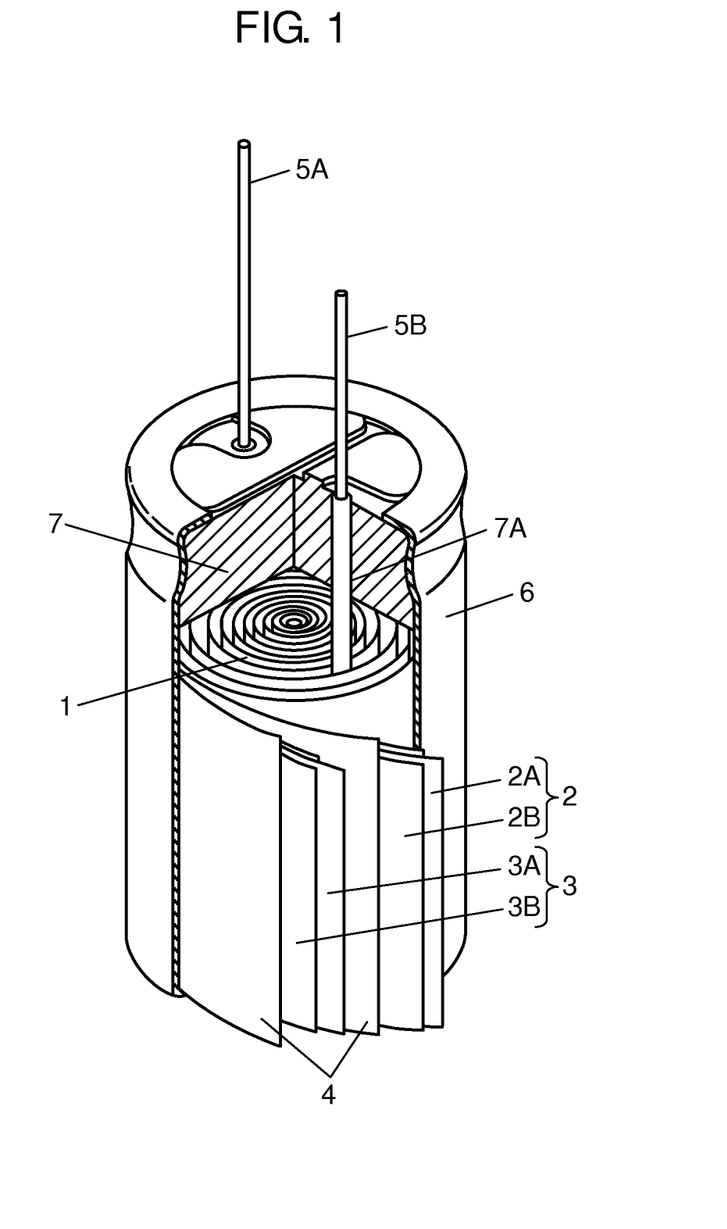
FIG. 1 is a partially cut-away perspective view of an electric double-layer capacitor in accordance with an exemplary embodiment of the present invention.

FIG. 1 is a cut-away perspective view of an electric double-layer capacitor in accordance with an exemplary embodiment of the present invention. The electric double-layer capacitor includes capacitor element 1, an electrolyte (not shown), case 6, and sealing member 7. Capacitor element 1 includes positive electrode 2, negative electrode 3, and separator 4 interposed between positive electrode 2 and negative electrode 3. Capacitor element 1 is impregnated with the electrolyte. Case 6 accommodates capacitor element 1 and the electrolyte. Sealing member 7 seals an opening of case 6.

Positive electrode 2 includes current collector 2A made of metal, and polarizable electrode layer 2B formed on a surface of current collector 2A and capable of adsorbing and desorbing anions in the electrolyte. Negative electrode 3 includes current collector 3A made of metal, and polarizable electrode layer 3B formed on a surface of current collector 3A and capable of adsorbing and desorbing cations in the electrolyte. In FIG. 1, capacitor element 1 is configured by winding positive electrode 2 and negative electrode 3 with separator 4 interposed therebetween, but it may be configured by laminating thereof. For separator 4, for example, cellulose-based paper, polytetrafluoroethylene non-woven fabric, or the like, having a thickness of about 35 μm and a density of 0.45 g/cm³ is used.

Lead wire 5A as a lead-out member is connected to a surface of positive electrode 2, and lead wire 5B is connected to a surface of negative electrode 3. Sealing member 7 is provided with a pair of through-holes 7A, and lead wires 5A and 5B are led to the outside via through-holes 7A.

Sealing member 7 is set to an opening of bottomed cylindrical case 6 with lead wires 5A and 5B inserted into through-holes 7A. Then, drawing process is carried out from the outer peripheral surface in the vicinity of the opening of case 6 in which sealing member 7 is positioned toward the inside of case 6, and curling process is carried out to an opening end of case 6. With these processes, sealing member 7 is fixed by crimping and gripping. Thus, sealing of the opening of case 6 is completed, and an electric double-layer capacitor is completed.

Next, positive electrode 2 and negative electrode 3 are described in detail. As current collectors 2A and 3A, for example, a high purity aluminum foil (containing Al at 99% or higher) having a thickness of about 15 μm can be used. This aluminum foil is used after the surface thereof is roughened by electrolytic etching in a chloride-based etchant. Polarizable electrode layers 2B and 3B are formed on the roughened front and rear surfaces of current collectors 2A and 3A, respectively. Examples of material constituting polarizable electrode layers 2B and 3B include activated carbon, a binding agent, a conductive agent, and the like.

Examples of the activated carbon include phenol-resin based activated carbon having an average particle diameter of 5 μm. Examples of the binding agent include an aqueous solution of carboxymethylcellulose (CMC). Examples of the conductive agent include acetylene black. These are mixed with each other at the weight ratio of 10:2:1 so as to prepare a mixture. Furthermore, the mixture is kneaded by a kneading machine, so that paste is prepared with viscosity adjusted to a predetermined range.

This paste is applied to both faces of current collectors 2A and 3A, dried in an air atmosphere at 100° C. to form polarizable electrode layers 2B and 3B having a thickness of 40 μm, and thus an electrode precursor is produced. Thereafter, the electrode precursor is subjected to slit process so as to have a predetermined width. Furthermore, polarizable electrode layers 2B and 3B are partially removed, respectively, and lead wires 5A and 5B are connected to exposed current collectors 2A and 3A by, for example, needle-caulking, respectively. As mentioned above, positive electrode 2 and negative electrode 3 are completed.

Note here that as the activated carbon, in addition to the phenol-resin based activated carbon, carbon material using palm shell, wood flour, paper, petroleum coke, petroleum pitch, or the like, as raw material may be used. The material is not particularly limited as long as it can desorb and adsorb ions on the surface thereof.

Case 6 is made of metal such as aluminum, copper, and nickel from the viewpoint of heat dissipation. Types of metal are not particularly limited as long as material is not likely to react with an electrolyte. Furthermore, case 6 may be a prism case or a laminate type case.

Examples of material of sealing member 7 include butyl rubber. However, it is not particularly limited as long as it is rubber material having elasticity.

Next, the electrolyte is described. The electrolyte includes an organic solvent, and a solute and a tertiary amine compound represented by chemical formula [1], both contained in the organic solvent.

[1]

$R^1$ and $R^2$ represent a methyl group or an ethyl group; $R^3$ represents a functional group having a straight chain including three or more carbon atoms and a hydroxyl group bonded to a terminal carbon; C represents a carbon atom; H represents a hydrogen atom; O represents an oxygen atom; and N represents a nitrogen atom.

The organic solvent is not particularly limited as long as it is an aprotic solvent capable of ionizing anions and cations constituting the solute. For example, typically, γ-butyrolactone, propylene carbonate, or the like, can be used. Other examples of lactones include γ-caprolactone, γ-valerolactone, or the like, and other examples of carbonates include ethylene carbonate or the like. Alternatively, sulfolanes may be used. Furthermore, mixtures thereof may be used.

Examples of the solute include ethyltrimethylammonium tetrafluoroborate (ETMA+BF$_4$−) as quaternary ammonium salt. As an anion of the solute, one including a fluorine atom in terms of the withstand voltage characteristic is preferable. BF$_4$− or PF$_6$− is particularly preferable. The concentration of the solute is preferably in the range from 0.5 to 2.0 mol/l.

As the solute, onium salt is preferable. Among them, quaternary ammonium salt is preferable. Among them, quaternary ammonium salt, for example, ETMA+, having a structure in which at least one functional group in four functional groups surrounding a nitrogen atom is different from the other functional groups, is preferable. Such quaternary ammonium salts are excellent in suppressing the electrolyte creepage inside the electric double-layer capacitor as compared with the other quaternary ammonium salt.

Note here that the solvent and the solute are not limited to the above-mentioned chemical species as long as they form electric double layers on positive electrode 2 and negative electrode 3 in the electrolyte.

Then, this electrolyte is allowed to contain the tertiary amine compound represented by chemical formula [1]. The content of the tertiary amine compound in the electrolyte is preferably 0.01 wt. % or more and 5 wt. % or less. The compound functions as a buffer agent in the electrolyte, and suppresses the change of pH in the electrolyte. Therefore, hydrolysis of a solvent, which is caused by a slight amount of moisture contained in the electrolyte, is suppressed, the change of pH of the electrolyte is suppressed, and reliability can be improved.

In chemical formula [1], $R^3$ includes a straight chain having three or more carbon atoms, and a hydroxyl group bonded to the terminal thereof. The carbon atoms constituting $R^3$ have hydrogen, an alkyl group, or the like, in a side chain moiety, and, besides, may be substituted with a halogen atom, a halogen-substituted alkyl group, or the like.

Furthermore, in the vicinity of the electrode, the solvent may be decomposed along with the change of pH. However, when the tertiary amine compound is used in the electrolyte, the decomposition of the solvent can be also suppressed. Thus, the change of the composition ratio of the electrolyte is suppressed, deterioration of characteristics such as capacity and resistance with the progress of charge/discharge cycle can be suppressed.

A method for producing the tertiary amine compound represented by chemical formula [1] is not particularly limited. As one example, the tertiary amine compound can be produced by the following method. That is to say, corresponding alkylhalomethyl ketone and dimethylamine are used as raw materials. The raw material is allowed to react in a solvent including alcohols such as ethanol. The tertiary amine compound can be produced by such operations.

The alcohols to which the above-mentioned raw materials are added are used in an amount that is, for example, 3 to 50 times as much as the weight of the raw materials. When the reaction proceeds, hydrogen halide is produced, and the produced amine compound is formed into hydrogen halide salt. Therefore, the reaction product is neutralized by using an appropriate base, so that a target amine compound can be obtained. Furthermore, if necessary, it is purified and before being used for the electrolyte.

(Performance Evaluation Test)

Hereinafter, effects of an electrolyte and an electric double-layer capacitor in accordance with this exemplary embodiment are described with reference to specific examples.

An electrolyte of sample 1 includes γ-butyrolactone as an organic solvent. Furthermore, the electrolyte includes ETMA+BF$_4$- that is quaternary ammonium salt as a solute. The concentration is 1.0 mol/l. Furthermore, as an example of the tertiary amine compound, 1.0 wt. % of compound A represented by chemical formula [2] is included.

[2]

An electrolyte of sample 2 has the same structure as that of the electrolyte of sample 1 except that compound A is not contained.

Figure 2:
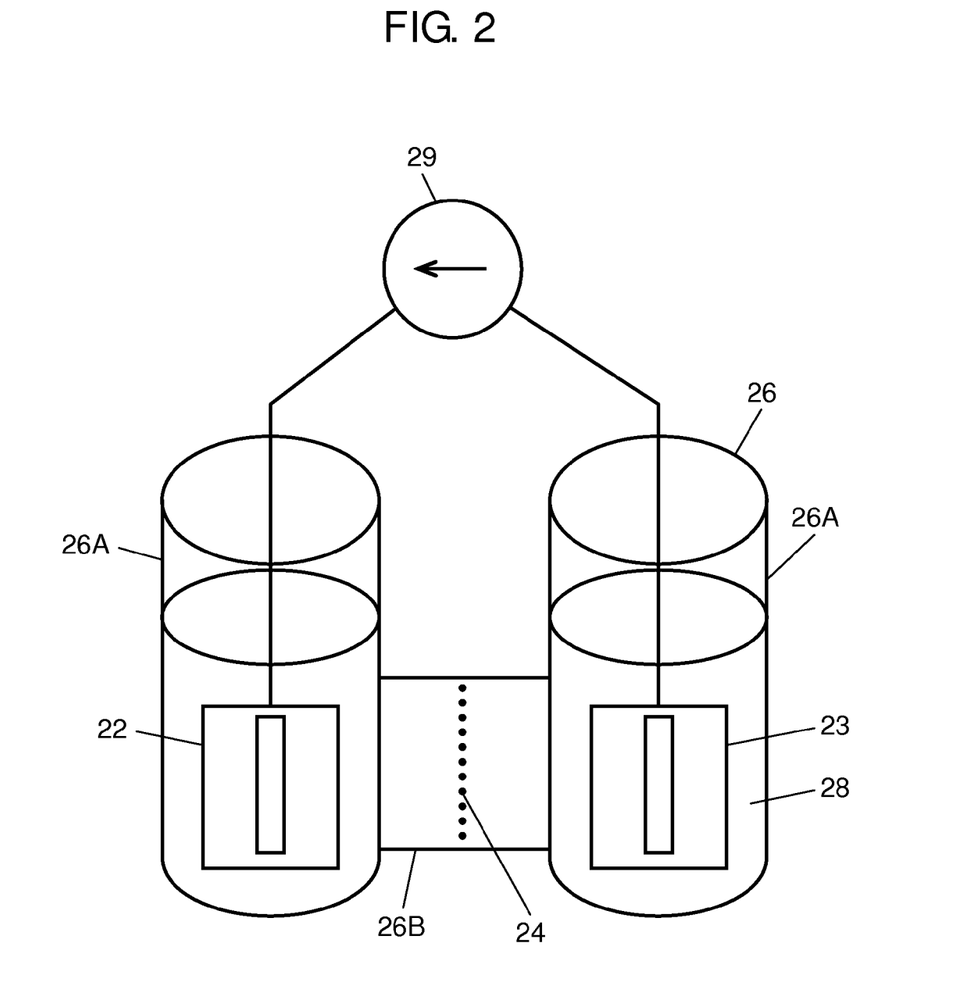
FIG. 2 is a schematic view of an H-shaped cell used for a performance evaluation test of an electrolyte in accordance with the exemplary embodiment of the present invention.

Samples 1 and 2 are evaluated by using an H-shaped cell shown in FIG. 2. FIG. 2 is a schematic view of the H-shaped cell that is used for a performance evaluation test in accordance with the exemplary embodiment of the present invention. The H-shaped cell includes H-shaped glass case 26, positive electrode 22, negative electrode 23, and glass filter 24. Glass case 26 is composed of a pair of bottomed cylindrical cell parts 26A, and tubular relay part 26B linking cell parts 26A to each other. Each of positive electrode 22 and negative electrode 23 is formed of a Pt foil, and accommodated in cell parts 26A, respectively. Glass filter 24 is disposed inside relay part 26B and separates positive electrode 22 and negative electrode 23 from each other. Then, glass case 26 is filled with electrolyte 28. Positive electrode 22 and negative electrode 23 are electrically connected to power source 29.

A direct current is applied to samples 1 and 2 at a current density of 1 mA/cm$^2$ for 60 minutes by using the H-shaped cell shown in FIG. 2 in a dry room. Then, pH of electrolyte 28 at a negative electrode 23 side is measured from a time at which the direct current starts to be applied to a time point when 60 minutes have passed. Then, pHs at the negative electrode side when 20 minutes and 60 minutes have passed are compared with each other in each sample.

Electric double-layer capacitors using electrolytes of samples 1 and 2 are produced, respectively, and the capacitors are subjected to a life test in conditions at 60° C., at 2.5 V, and for 250 hours. Capacity retention rates of the electric double-layer capacitors after 250 hour have passed are compared with each other.

TABLE 1

| sample | pH after 20 min. | pH after 60 min. | capacity retention rate (%) |
|---|---|---|---|
| 1 | 12.2 | 13.4 | 97.3 |
| 2 | 12.8 | 14.0 | 92.8 |

These evaluation results are shown in Table 1. From Table 1, in the electrolyte of sample 1 including compound A, the change of pH is suppressed as compared with sample 2, and pH value is low. Furthermore, it is also shown that in the electric double-layer capacitor using the electrolyte of sample 1, deterioration of capacity is suppressed as compared with the electric double-layer capacitor using electrolyte of sample 2.

As mentioned above, the electrolyte of this exemplary embodiment includes the tertiary amine compound represented by chemical formula [1] as a compound in the electrolyte. Thus, the tertiary amine compound acts on the moisture in the electrolyte, thereby suppressing hydrolysis of the solvent. Therefore, it is possible to suppress the change of pH of the electrolyte, which may occur when charge and discharge of an electric double-layer capacitor using the electrolyte are repeated.

Note here that it is confirmed that the same results are shown in other than compound A also when any one or both of $R^1$ and $R^2$ are an ethyl group.

In the above description, the tertiary amine compound included in the electrolyte is intentionally contained in the electrolyte, but the configuration of the present invention is not limited to this. For example, when quaternary ammonium salt is used as a solute, and γ-butyrolactone is used as a solvent, these react with each other, so that the tertiary amine compound is produced by the following reaction. In this way, also when the tertiary amine compound is produced after the electric double layer capacitor is fabricated, the change of pH is suppressed.

-continued $C_7H_{15}O_2N$: FW. 145

The above-mentioned reaction formula includes steps 1 to 6. In step 1, a hydroxide ion (OH−) generated by electrolysis of moisture contained in the electrolyte in a slight amount attack a hydrogen atom of a methyl group of an ethyltrimethyl ammonium cation as the cation. As a result, the methyl group releases a proton. Consequently, ammonium ylide is produced.

In step 2, the ammonium ylide reacts with γ-butyrolactone as the solvent so as to form one compound. Thereafter, as shown in step 3, the five-membered ring derived from γ-butyrolactone is opened to stabilize the compound, and a compound having a carbonyl group shown in step 4 is formed.

The compound reacts with moisture contained in the electrolyte with each other as shown in step 5, and, finally, compound A that is one type of the tertiary amine compound having a molecular weight of 145 is produced as shown in step 6.

Then, when compound A produced from the reaction is contained in the electrolyte in the content of 0.01 wt. % or more and 5 wt. % or less, property deterioration of the electric double-layer capacitor, accompanying charge/discharge cycle, can be suppressed.

The content of the tertiary amine compound in the electrolyte is dependent upon the amount of moisture included in capacitor element 1. The amount of moisture includes also moisture generated by decomposition of a cellulose component included in capacitor element 1 when charge and discharge cycles of the electric double-layer capacitor are carried out, in addition to the moisture that has not been removed from positive electrode 2, negative electrode 3, separator 4, and the electrolyte constituting capacitor element 1. Furthermore, preferable production conditions include charge and discharge in high temperature conditions at 60° C. or higher, as charge/discharge environment.

Furthermore, in the above description, as a cation that forms ammonium ylide, an ethyltrimethyl ammonium cation is used, but the cation is not particularly limited to this. In a quaternary ammonium cation having a substituent including a methyl group and an ethyl group, besides, a dimethylethyl ammonium cation or the like can be also used.

Next, an effect of a case where a tertiary amine compound is produced after an electric double layer capacitor is fabricated is described with reference to specific examples.

In samples 3 to 8, electric double-layer capacitors are produced by the same method as in sample 1 by using electrolytes including $ETMA^+BF_4^-$ as a solute and γ-butyrolactone as a solvent and having a concentration of 0.9 mol/l except that the amount of moisture inside capacitor element 1 is changed. Sample 9 has the same configuration as in sample 4 except that tetraethyl ammonium tetrafluoroborate is used as a solute. These electric double-layer capacitors of samples 3 to 8 are subjected to a life test. This test is carried out in conditions at 60° C., at 2.5V, and for 250 hours, and a production amount of a tertiary amine compound, a pH value of the electrolyte, and a capacity retention rate of each electric double-layer capacitor after the test arecompared. The results are shown in Table 2.

TABLE 2

| sample | amount of moisture in capacitor ppm | content of compound wt % | pH of electrolyte | capacity retention rate % |
|---|---|---|---|---|
| 3 | 100 | 0.01 | 13.1 | 97.3 |
| 4 | 380 | 2.28 | 13.6 | 92.8 |
| 5 | 610 | 4.85 | 13.2 | 93.1 |
| 6 | 740 | 6.92 | 13.5 | 83.3 |
| 7 | 1028 | 12.9 | 13.2 | 80.6 |
| 8 | 30 | 0.005 | 14.2 | 81.9 |
| 9 | 380 | Not measurable | 14.8 | 89.6 |

In samples 3 to 5 in which the content of the tertiary amine compound is 0.01 wt. % or more and 5 wt. % or less, the change of pH is suppressed and remarkable reduction of the capacity retention rate is not observed. On the other hand, regarding each of samples 6 and 7 in which the content of the tertiary amine compound is more than 5 wt. %, sample 8 in which the content of the tertiary amine compound is less than 0.01 wt. %, and sample 9 in which a different cation is used, the capacity retention rate is reduced and pH is increased to promote alkalization.

As described above, when conditions, in which the moisture amount in capacitor element 1 falls in a certain range so that the electrolyte contains the tertiary amine compound at 0.01 wt. % or more and 5 wt. % or less, are satisfied, the change of pH and the reduction of the capacity retention rate are suppressed.

Next, other compounds having the similar effect to that of the tertiary amine compound are described.

An electrolyte and an electric double-layer capacitor using the electrolyte may have a configuration including quaternary ammonium salt having a cation represented by chemical formula [3] in the electrolyte. Also in this case, the change of pH of the electrolyte can be suppressed.

[3]

(N represents nitrogen, $R^1$ to $R^3$ represent organic substituents having one or more carbon atoms, and compositions of $R^1$ to $R^3$ are the same as each other or at least one of the compositions is different form the others. $R^\alpha$ has one or more carbon atoms, and the carbon atoms constituting $R^\alpha$ has an electron-attracting group. At least one substituent of $R^1$ to $R^3$ and $R^\alpha$ has a hydrogen atom bonded to the carbon atom positioned nearest to the nitrogen atom.)

The above-mentioned cation reacts with OH− in the electrolyte, which is a cause of a change of pH. From the reaction, nitrogen ylide including bonding of a nitrogen atom and a carbon atom, and represented by the following chemical formula [4], can be produced easily. Thanks to this reaction, when the electric double-layer capacitor repeats charge and discharge, the increase of OH− in the electrolyte is suppressed, thus suppressing a change of pH in the electrolyte to an alkaline side.

[4]

(C represents carbon, N represents nitrogen, and $R^a$ to $R^e$ represent organic or inorganic substituent.)

In the above-mentioned cation, in at least one substituent in substituents $R^1$ to $R^3$ and $R^\alpha$ surrounding the nitrogen atom, a hydrogen atom is bonded to a carbon atom directly bonded to a nitrogen atom. In order to achieve the effect of suppressing the change of pH, it is necessary to produce nitrogen ylide by allowing the above-mentioned cation to react with OH−. That is to say, a proton generated by ionization of the hydrogen atom and OH− in the electrolyte need to react with each other. In other words, in order to allow the proton and OH− to react with each other easily, it is necessary to reduce the electron density of hydrogen atoms and to make a state for facilitating abstraction of the hydrogen atoms in the above-mentioned cation.

As a method for reducing the electron density, herein, at least one electron-attracting group is bonded to a carbon of $R^\alpha$ in chemical formula [3]. When the electron-attracting group is provided on $R^\alpha$, the electron density of the hydrogen atom relating to the formation of nitrogen ylide is reduced, and the hydrogen atom can be easily abstracted. Thus, the reaction of the above-mentioned cation with OH− can be promoted.

Examples of the electron-attracting group include —F, —Cl, —Br, —OR, =O, —COR, —$CO_2$R, —$NO_2$, —$SO_2$R, —CN, —CR=$CR_2$, —C≡R, —$CH_xF_y$, and —$CH_vF_w$—$CH_xF_y$. Herein, —, =, and ≡ represent a binding state of atoms or molecules, R represents an inorganic or organic substituent, and others represent atoms based on the periodic table. Furthermore, v and w represent an integer of 0 or more and 2 or less and satisfy v+w=2, and x and y represent an integer of 0 or more and 3 or less and satisfy x+y=3. Among them, —F, —COR, —$NO_2$, —CN, and the like, have high electron-attracting property, and can promote reaction with OH−.

$R^1$ to $R^3$ in chemical formula [3] represent an organic substituent having one or more carbon atoms bonded to a nitrogen atom positioned in the center. $R^1$ to $R^3$ may have a structure having the above-mentioned electron-attracting group. Furthermore, the effect of reducing the electron density may vary due to the position relation between the electron-attracting group provided in the cation represented by chemical formula [3] and a hydrogen atom to be abstracted at the formation time of ylide. However, when the electron-attracting group is included, as compared with conventional quaternary ammonium salt without having the electron-attracting group, alkalization is suppressed. Therefore, for promoting conversion of the quaternary ammonium salt into ylide, a structure in which the above-mentioned electron-attracting group is bonded to a carbon atom having a hydrogen atom to be abstracted is preferable.

However, this nitrogen ylide is generally unstable, and it is difficult to produce it stably. One method for solving this problem includes reducing the electron density of carbon atoms bonded to the nitrogen atom by the electron-attracting group. This is because when the electron density of carbon atoms is reduced by the electron-attracting group, the electron density can be widely distributed in the molecule. This can suppress decomposition of nitrogen ylide, so that nitrogen ylide becomes stable.

As mentioned above, stabilization of nitrogen ylide reduces an energy barrier that is present in a process in which quaternary ammonium salt reacts into nitrogen ylide. Therefore, it is possible to promote the reaction into ylide. Consequently, even in particularly high temperature conditions, OH− in the electrolyte and the quaternary ammonium cation represented by chemical formula [3] react with each other stably, so that a change of pH in the capacitor can be suppressed.

In addition, this nitrogen ylide can react with substances having an appropriate double bond. For example, it reacts with γ-butyrolactone, propylene carbonate, or the like, having a carbonyl group, and is converted into an electrically neutral substance that does not affect electrical characteristics.

A method for producing quaternary ammonium salt including the cation represented by chemical formula [3] is not particularly limited, but examples of the method include the following method.

Firstly, dimethyl carbonate (9.0 g, 100 mmol), amine (100 mmol) having an electron-attracting group, and methanol as a solvent are placed in an autoclave, and allowed to react with each other while they are stirred at 115° C., at 0.5 MPa, and for 12 hours. After reaction, unreacted raw material and the solvent are removed by using an evaporator so as to obtain methyl carbonate as a methylated product. This methyl carbonate is dissolved in water, and heated under a reduced pressure to further remove methanol.

Next, an aqueous solution of tetrafluoroboric acid is added to an aqueous solution of methyl carbonate so that tetrafluoroboric acid becomes equivalent molar to methyl carbonate, and the mixture solution is heated and stirred. When generation of gas stops, gas is further removed by heating under a reduced pressure. Thereafter, by removing water by, for example, evaporation, one example of the quaternary ammonium salt represented by chemical formula [3] can be produced.

It is preferable that chemical formula [3] has a structure in which each of $R^1$ to $R^3$ represents a substituent having two or less carbon atoms, and two or three substituents each having one carbon atom are present in the four substituents including $R^\alpha$ surrounding the nitrogen atom. Quaternary ammonium salts formed by such a relation of the number of carbon atoms easily form ylide. Then, when such a quaternary ammonium salt is provided with an electron-attracting group, stabilization of ylide can be improved in addition to original property of easily forming ylide. Thus, the change of pH in the electric double-layer capacitor can be further suppressed. When the above-mentioned effect of the electron-attracting group and the position relation of hydrogen atoms to be abstracted are considered, it is preferable that the number of carbon atom in the above-mentioned $R^\alpha$ is one.

Next, an example in which further different compounds are used is described. That is to say, an electrolyte and an electric double-layer capacitor using the electrolyte may have a configuration in which the electrolyte includes quaternary phosphonium salt having a cation represented by chemical formula [5]. Also in this case, a change of pH of the electrolyte can be suppressed.

[5]

P represents phosphorus, $R^1$ to $R^3$ represent organic substituents each having one or more carbon atoms, and compositions of $R^1$ to $R^3$ are the same as each other or at least one of them is different from the others. $R^\alpha$ has one or more carbon atoms, carbon atoms constituting $R^\alpha$ have an electron-attracting group, and at least one substituent of $R^1$ to $R^3$ and $R^\alpha$ includes a hydrogen atom bonded to a carbon atom that is the nearest to the phosphorus atom. Herein, the electron-attracting group provided in chemical formula [5] is the same as that of chemical formula [3].

Note here that a method for producing quaternary phosphonium salt is not particularly limited, but examples of the method includes the following method.

Triphenylphosphine is dissolved in an appropriate solvent such as tetrahydrofuran in an inert atmosphere, and is allowed to react with alkyl halide so as to prepare alkyl triphenylphosphine halide. Next, by carrying out an anion exchange reaction, alkyl triphenylphosphine tetrafluoroboric acid as an example of the quaternary phosphonium salt including the cation represented by chemical formula [5] can be prepared.

It is preferable that the cation represented by chemical formula [5] has a structure in which two or three substituents each having one carbon atom are present among the four substituents including $R^\alpha$ surrounding a phosphorus atom. A quaternary phosphonium salt having such a relation of the number of carbon atoms easily forms ylide. Then, when such a quaternary phosphonium salt is provided with an electron-attracting group, stabilization of ylide can be improved in addition to original property of easily forming ylide. Thus, the change of pH in the electric double-layer capacitor can be further suppressed. When the above-mentioned effect of the electron-attracting group and the position relation of hydrogen atoms to be abstracted are considered, it is preferable that the number of carbon atom in the above-mentioned $R^\alpha$ is one.

Next, an example in which further different compounds are used is described. That is to say, an electrolyte and an electric double-layer capacitor using the electrolyte may have a configuration in which the electrolyte includes tertiary sulfonium salt or tertiary sulfoxonium salt having cations represented by chemical formula [6] or [7]. Also in this case, a change of pH of the electrolyte can be suppressed.

[6]

[7]

S represents sulfur, O represents oxygen, $R^1$ and $R^2$ represent organic substituents each having one or more carbon atoms, and compositions of $R^1$ and $R^2$ are the same as each other or are different from each other. $R^\alpha$ has one or more carbon atoms, and carbon atoms constituting $R^\alpha$ have an electron-attracting group. At least one substituent of $R^1$ and $R^2$ and $R^\alpha$ includes a hydrogen atom bonded to a carbon atom that is the nearest to a sulfur atom of the cation. Herein, an electron-attracting group provided in chemical formulae [6] and [7] is the same in chemical formula [3].

A method for producing tertiary sulfonium salt or tertiary sulfoxonium salt is not particularly limited, but the method include the following method as an example.

Trialkyl oxonium tetrafluoroboric acid is added to an organic sulfur compound dissolved in an appropriate solvent such as tetrahydrofuran in inert atmosphere, and they are allowed to react with each other by stirring them at ordinary temperature and under ordinary pressure. After reaction, the solvent and unreacted raw material are removed, and the resultant product is dried under a reduced pressure, so that corresponding salt can be prepared.

As the above-mentioned organic sulfur compound, sulfide is used when tertiary sulfonium salt is prepared, and sulfoxide is used when tertiary sulfoxonium salt is prepared. Alternatively, when aryl sulfide or aryl sulfoxide is used, corresponding sulfonium salt or sulfoxonium salt can be prepared by coexistence of appropriate alkyl halide and silver fluoroborate during the reaction.

In this way, when a substituent of onium salt is provided with an electron-attracting group, an effect of suppressing alkalization can be enhanced.

INDUSTRIAL APPLICABILITY

In an electrolyte of the present invention, a change of pH is suppressed. Consequently, an electric double-layer capacitor using the electrolyte suppresses leakage of the electrolyte to the outside. Therefore, the electric double-layer capacitor of the present invention has high reliability as a storage unit. Therefore, it can be used in applications for electronic apparatuses and vehicle-mounted storage units requiring high reliability.

The invention claimed is:
1. An electrolyte comprising:
an organic solvent; and
a solute and a tertiary amine compound represented by chemical formula [1], which are contained in the organic solvent:

[1]

where, $R^1$ and $R^2$ represent a methyl group or an ethyl group; $R^3$ represents a functional group having a straight chain including three or more carbon atoms and a hydroxyl group bonded to a terminal carbon; C represents a carbon atom; H represents a hydrogen atom; O represents an oxygen atom; and N represents a nitrogen atom.

2. The electrolyte according to claim 1, wherein the solute is quaternary ammonium salt.

3. The electrolyte according to claim 1, wherein the tertiary amine compound is contained in 0.01 wt. % or more and 5 wt. % or less.

4. The electrolyte according to claim 1, wherein the tertiary amine compound is a compound represented by chemical formula [2]

[2]

5. An electric double-layer capacitor comprising:
a capacitor element including:
  a positive electrode;
  a negative electrode; and
  a separator interposed between the positive electrode and the negative electrode;
an electrolyte with which the capacitor element is impregnated;
a case accommodating the capacitor element and the electrolyte; and
a sealing member sealing an opening of the case,
wherein the electrolyte includes an organic solvent, a solute and a tertiary amine compound represented by chemical formula [1] which are contained in the organic solvent, and
wherein the positive electrode is capable of adsorbing and desorbing an anion in the electrolyte, the negative electrode is capable of adsorbing and desorbing a cation in the electrolyte:

[1]

where, $R^1$ and $R^2$ represent a methyl group or an ethyl group; $R^3$ represents a functional group having a straight chain including three or more carbon atoms and a hydroxyl group bonded to a terminal carbon; C represents a carbon atom; H represents a hydrogen atom; O represents an oxygen atom; and N represents a nitrogen atom.

6. The electric double-layer capacitor according to claim 5, wherein the solute is quaternary ammonium salt.

7. The electric double-layer capacitor according to claim 5, wherein the tertiary amine compound is contained in 0.01 wt. % or more and 5 wt. % or less.

8. The electric double-layer capacitor according to claim 5, wherein the tertiary amine compound is a compound represented by chemical formula [2]

[2]

* * * * *